UNITED STATES PATENT OFFICE 2,484,124

MIXED LONG CHAIN CELLULOSE ESTERS

George W. Seymour, Blanche B. White, and Thomas G. Davis, Cumberland, Md., assignors to Celanese Corporation of America, a corporation of Delaware No Drawing. Application May 3, 1945, Serial No. 591,836

5 Claims. (Cl. 260—225)

This invention relates to the preparation of mixed organic acid esters of cellulose containing the acyl group of a long chain aliphatic acid, and relates more particularly to the preparation of cellulose acetate-laurate.

An object of this invention is to provide an improved process for the production of mixed organic acid esters of cellulose containing long chain aliphatic acid radicals.

Another object of this invention is the production of mixed organic acid esters of cellulose containing a long chain aliphatic acid radical such as, for example cellulose acetate-laurate, which esters exhibit improved stability and molding characteristics.

A further object of this invention is an efficient and economical process for the production of cellulose acetate-laurate containing a relatively high proportion of lauryl groups.

Other objects of this invention will appear from the following detailed description.

In the preparation of mixed organic acid esters of cellulose which contain as one substituent the radical of a long chain aliphatic acid of 12 to 20 carbon atoms, various esterification procedures may be employed. In accordance with one procedure, cellulose may be esterified directly with an esterification medium comprising a mixture of esterifying agents, the mixture being adapted to introduce the desired acyl groups in the cellulose molecule. Where the mixed cellulose ester is to contain acetyl groups in addition to the radical of a long chain aliphatic acid, the starting material for the preparation of the mixed ester may comprise hydrolyzed or ripened cellulose acetate. The latter, containing the desired proportion of acetyl groups, may then be further esterified with a long chain aliphatic acid chloride and the free hydroxy groups present in the hydrolyzed cellulose acetate molecule at least partly replaced by long chain fatty acid groups. By this process, mixed organic acid esters of cellulose containing the desired proportion of acetyl and long chain aliphatic acid groups may be obtained. While the latter process is, in general, quite feasible for the production of certain mixed cellulose esters, the preparation of esters containing a fairly high proportion of the higher fatty acid groups of 12 to 20 carbon atoms in this manner is more difficult. After about 0.1 to 0.3 long chain aliphatic acid groups per glucose residue are placed therein, the hydrolyzed cellulose acetate appears to resist further introduction of the higher aliphatic acid groups. Even resorting to drastic esterification conditions involving the use of relatively high temperatures and prolonged reaction periods does not appear to result in any appreciable increase in the introduction of the higher aliphatic acid groups.

We have now found that mixed organic acid esters of cellulose containing a relatively high proportion of long chain aliphatic acid radicals may be prepared by esterifying a hydrolyzed lower aliphatic acid ester of cellulose with a long chain aliphatic acid esterifying agent if the hydrolyzed lower aliphatic acid ester of cellulose being esterified is first subjected to a destabilizing treatment prior to further esterification. By effecting destabilization of the hydrolyzed lower aliphatic acid ester of cellulose prior to reaction with the desired long chain aliphatic acid esterifying agent, the reaction time necessary to effect the desired degree of substitution is shortened to a remarkable degree. The mixed organic acid esters of cellulose which are obtained exhibit excellent physical and molding characteristics.

In accordance with our novel process, the destabilization may be effected in a relatively simple manner by subjecting the hydrolyzed lower aliphatic acid ester of cellulose to the washing or leaching action of distilled water at an elevated temperature. Preferably, the distilled water employed is maintained at a temperature of 80 to 100° C. when washing, and a satisfactory degree of destabilization is effected by treating the cellulose ester with from 24 to 60 volumes of distilled water. While the total volume of water may be applied as a single treatment, we preferably effect destabilization by a plurality of treatments wherein the total volume of water to be employed is divided up and several washings are effected.

Following destabilization, the hydrolyzed lower aliphatic acid ester of cellulose is dried and may then be esterified. Esterification is effected by dissolving the hydrolyzed lower aliphatic acid ester of cellulose in pyridine at a temperature of 50 to 70° C. and reacting said cellulose ester with a calculated amount of the acid chloride of a long chain aliphatic acid under esterifying conditions, whereby the desired mixed organic acid ester of cellulose is formed. The esterification may be carried out by raising the temperature of the reaction mixture to 85 to 100° C. and maintaining it at this temperature for 1 to 3 hours. The mixed organic acid ester of cellulose formed may be recovered by diluting the pyridine solution with a suitable water-miscible or water-soluble organic diluent such as acetone, methyl acetate or dioxan, and then streaming the diluted solution into a large excess of water with agitation whereby the ester is precipitated. The addition of a water-miscible organic diluent to the pyridine solution enables the precipitation of the cellulose ester to be effected much more easily and satisfactorily, the presence of the water-miscible diluent minimizing the normally hydrophobic character of the mixed cellulose ester. The precipitated mixed cellulose ester is washed free of hydrochloric acid, dried, ground, freed of any higher aliphatic acid by extraction with ether and then stabilized, washed neutral and dried.

While the novel process of our invention may be employed in connection with the preparation of various mixed organic acid esters of cellulose containing the radicals of both higher and lower aliphatic acids, it will be more particularly described in connection with the preparation of cellulose acetate-laurates containing a relatively high proportion of combined lauric acid, since said mixed cellulose esters possess a combination of outstanding and valuable properties.

Thus, in the preparation of cellulose acetate-laurate, the cellulose acetate, which is to be subjected to hydrolysis and destabilization prior to further esterification with the acid chloride of lauric acid, may be prepared by suitably acetylating cellulose. The cellulose may be acetylated with or without activation comprising pretreatment with organic acids or organic acids containing some sulfuric acid, by employing an esterifying medium comprising acetic anhydride and an acid esterification catalyst, such as sulfuric acid, together with glacial acetic acid which acts as a solvent for the cellulose acetate formed. The sulfuric acid catalyst may be present in amounts of from 9 to 15% or even 20% on the weight of the cellulose. Part of the sulfuric acid catalyst may be introduced during the pretreatment which is designed to render the cellulose more reactive.

When acetylation is completed, water is stirred into the reaction mixture to convert the excess acetic anhydride to acetic acid and, after the addition of a further quantity of water, the resulting solution of cellulose acetate in acetic acid containing the sulfuric acid employed as the catalyst is permitted to stand and to ripen or hydrolyze in solution. Combined acetic acid is split off during hydrolysis leaving free hydroxy groups whose number depends on the degree of hydrolysis effected. Preferably, we conduct the hydrolysis until the cellulose acetate has been reduced to an acetyl value of 42 to 47%, calculated as acetic acid, these esters containing from 1.10 to 1.40 free hydroxy groups per glucose residue. The cellulose acetates of these characteristics are the most suitable for further esterification in accordance with our novel process to form the cellulose acetate-laurates containing a relatively high proportion of combined lauric acid. After the cellulose acetate has been ripened to the desired characteristics, it may be precipitated from solution by the addition of a large excess of water thereto, washed free of acid and dried. The dried cellulose acetate, prepared as described, may then be destabilized and esterified further by reaction with lauroyl chloride.

The cellulose acetate is destabilized by washing with 24 to 60 volumes of distilled water, preferably at the boiling point, the total volume of water being employed for effecting a plurality of washes, say 4 to 6 in number. The destabilized cellulose acetate is then dried.

Following drying, the destabilized cellulose acetate is dissolved in 6.0 to 8.0 parts by weight, on the cellulose acetate, of pyridine, the temperature of the solution raised to 50 to 90° C., preferably about 70° C. and from 1.0 to 1.5 parts by weight of lauroyl chloride are then added slowly with stirring. As the lauroyl chloride is added, the temperature is gradually raised to 85 to 100° C., and the reaction mixture maintained at this temperature for 1 to 3 hours with stirring. At the end of this period, the reaction mixture is cooled to 40 to 50° C. and then diluted with 1 to 2 volumes of a suitable water-miscible organic diluent such as methyl acetate, dioxan, or acetone. The cellulose acetate-laurate may be precipitated from solution by gradually adding the reaction mixture, with stirring, to a large excess of water.

Any hydrochloric acid on the ester is removed by further washing with water, the ester then dried, preferably ground, and any free lauric acid removed by extraction with a volatile solvent, such as ether. The cellulose acetate-laurate is stabilized, preferably under pressure, extracted again with a mixture of ethyl alcohol and water to remove colored impurities and then washed neutral with water and dried.

The mixed cellulose acetate-laurates obtained in accordance with our novel process may contain from 0.60 to 0.80 free hydroxyl groups, from 0.50 to 0.80 lauryl groups and 1.4 to 1.75 acetyl groups per glucose residue. These esters possess very satisfactory stability characteristics and may be molded at 165 to 200° C., with or without the use of plasticizers, to yield excellent molded products.

In order further to illustrate our invention, but without being limited thereto, the following example is given:

*Example*

100 parts of cellulose are pretreated with 35 parts acetic acid, 0.5% sulfuric acid and 0.5% water. Acetylation is carried out over a period of 3¼ hours with an acetylation mixture comprising acetic acid and acetic anhydride. When acetylation is completed, using a total of 10 to 15% sulfuric acid on the weight of the cotton as the acetylation catalyst, a portion of the sulfuric acid is neutralized by the addition of magnesium salts and ripening is carried out at 60° with a total of 75% of water on the weight of the original cellulose being added. The charge is ripened to an acetyl value of 44%, calculated as acetic acid. The charge is precipitated, washed and dried.

100 parts by weight of the cellulose acetate of 44% acetyl value, prepared as described above, are destabilized by washing with a total of 50 volumes of distilled water at the boiling point. The water employed is divided up into five portions so as to effect five separate washes. The destabilized cellulose acetate obtained is then dried, the dried cellulose acetate dissolved in 650 parts by weight of pyridine at 70° C. and 135 parts by weight of lauroyl chloride are then added slowly with stirring while raising the temperature to 90° C. The temperature is brought up to 95 to 97° C. when all the lauroyl chloride is added, and the resulting reaction mixtures held at this temperature for two hours until reaction is complete. The reaction mixture is cooled to 40 to 50° C. diluted with an equal volume of acetone and the cellulose acetate-laurate formed precipitated from solution by adding the reaction mixture to a large excess of water. The precipitated cellulose acetate-laurate is washed with water to free it of hydrochloric acid, dried, ground and extracted with ether to remove any free lauric acid. The ether-extracted cellulose acetate-laurate is stabilized by heating under 22 pounds per sq. inch pressure at 128° C. with 10 volumes of 0.04% aqueous sulfuric acid. After stabilization the ester is washed again with a 40% aqueous solution of ethyl alcohol, washed neutral to brom thymol blue with water and dried. The cellulose acetate-laurate obtained contains 0.58 lauryl groups, 1.66 acetyl groups and 0.76 free hydroxy groups per glucose residue. The ester may be molded at 200° C. without the use of any plasticizer and suffers little viscosity loss. The molding operation yields a very satisfactory, non-brittle molded article.

It is to be understood that the foregoing detailed description is given merely by way of illustration and that many variations may be made therein without departing from the spirit of our invention.

Having described our invention what we desire to secure by Letters Patent is:

1. Process for the production of cellulose acetate-laurate, which comprises destabilizing a partially hydrolyzed cellulose acetate of an acetyl value of 42 to 47%, calculated as acetic acid, by washing with distilled water at 80 to 100° C., dissolving the destabilized, partially hydrolyzed cellulose acetate in pyridine, adding lauroyl chloride to the solution obtained and maintaining the reaction mixture at an esterifying temperature.

2. Process for the production of cellulose acetate-laurate, which comprises destabilizing a partially hydrolyzed cellulose acetate of an acetyl value of 42 to 47%, calculated as acetic acid, by washing with distilled water at 80 to 100° C., dissolving the destabilized, partially hydrolzyed cellulose acetate in 6 to 8 parts by weight pyridine, adding 1.0 to 1.5 parts by weight lauroyl chloride to the solution obtained and maintaining the reaction mixture at an esterifying temperature.

3. Process for the production of cellulose acetate-laurate, which comprises destabilizing a partially hydrolyzed cellulose acetate of an acetyl value of 42 to 47%, calculated as acetic acid, by washing with distilled water at 80 to 100° C., dissolving the destabilized, partially hydrolyzed cellulose acetate in 6 to 8 parts by weight pyridine, adding 1.0 to 1.5 parts by weight lauroyl chloride to the solution obtained and maintaining the reaction mixture at an esterifying temperature of 85 to 100° C.

4. Process for the production of cellulose acetate-laurate, which comprises destabilizing a partially hydrolyzed cellulose acetate of an acetyl value of 42 to 47%, calculated as acetic acid, by washing with distilled water at 80 to 100° C., dissolving the destabilized, partially hydrolyzed cellulose acetate in 6 to 8 parts by weight pyridine, adding 1.0 to 1.5 parts by weight lauroyl chloride to the solution obtained and maintaining the reaction mixture at an esterifying temperature of 80 to 100° C., for 1 to 3 hours.

5. Process for the production of cellulose acetate-laurate, which comprises destabilizing a partially hydrolyzed cellulose acetate of an acetyl value of 42 to 47%, calculated as acetic acid, by washing with distilled water at 80 to 100° C., dissolving the destabilized, partially hydrolyzed cellulose acetate in 6 to 8 parts by weight pyridine, adding 1.0 to 1.5 parts by weight lauroyl chloride to the solution obtained maintaining the reaction mixture at an esterifying temperature of 85 to 100° C. for 1 to 3 hours, diluting the solution with acetone, and precipitating the cellulose acetate-laurate from solution with water.

GEORGE W. SEYMOUR.
BLANCHE B. WHITE.
THOMAS G. DAVIS.

REFERENCES CITED

The following references are of record in the file of this patent:

UNITED STATES PATENTS

| Number | Name | Date |
|---|---|---|
| 1,928,652 | Malm et al. | Oct. 3, 1933 |
| 2,250,201 | Malm et al. | July 22, 1941 |
| 2,360,239 | Kirton et al | Oct. 10, 1944 |
| 2,365,258 | Farquhar | Dec. 19, 1944 |

FOREIGN PATENTS

| Number | Country | Date |
|---|---|---|
| 392,775 | Great Britain | May 25, 1933 |